US007938722B2

(12) United States Patent
Rowe et al.

(10) Patent No.: US 7,938,722 B2
(45) Date of Patent: May 10, 2011

(54) ENHANCED GAMING CHIPS AND TABLE GAME SECURITY

(75) Inventors: Richard E. Rowe, Incline Village, NV (US); Richard J. Schneider, Las Vegas, NV (US); Binh T. Nguyen, Reno, NV (US)

(73) Assignee: IGT, Reno, NV (US)

( * ) Notice: Subject to any disclaimer, the term of this patent is extended or adjusted under 35 U.S.C. 154(b) by 1326 days.

(21) Appl. No.: 11/224,903

(22) Filed: Sep. 12, 2005

(65) Prior Publication Data

US 2007/0060311 A1 Mar. 15, 2007

(51) Int. Cl.
*A63F 9/24* (2006.01)
*A63F 13/00* (2006.01)

(52) U.S. Cl. ................ 463/29; 463/25; 463/36; 463/39; 463/40; 463/42; 463/43

(58) Field of Classification Search .................... 463/25, 463/43, 46–47, 29; 340/593.1
See application file for complete search history.

(56) References Cited

U.S. PATENT DOCUMENTS 3,766,452 A * 10/1973 Burpee et al. ................. 194/214
5,499,017 A * 3/1996 Beigel ........................ 340/572.1
5,651,548 A * 7/1997 French et al. ................... 463/25
5,735,742 A * 4/1998 French ............................ 463/25
5,767,789 A * 6/1998 Afzali-Ardakani et al. . 340/10.1
5,883,582 A * 3/1999 Bowers et al. ............... 340/10.2
5,919,090 A * 7/1999 Mothwurf ....................... 463/25
5,963,144 A * 10/1999 Kruest ......................... 340/10.1
6,008,727 A * 12/1999 Want et al. ................. 340/572.1
6,084,530 A * 7/2000 Pidwerbetsky et al. ...... 340/10.1
6,340,931 B1 * 1/2002 Harrison et al. ........... 340/572.1
6,366,205 B1 * 4/2002 Sutphen ..................... 340/568.6
6,424,315 B1 * 7/2002 Glenn et al. .................. 343/895
(Continued)

FOREIGN PATENT DOCUMENTS

EP 1017005 7/2000
(Continued)

OTHER PUBLICATIONS

PCT Search Report and Written Opinion from Corresponding International Application No. PCT/US2006/034510, dated Apr. 6, 2007, 15 pages.

(Continued)

*Primary Examiner* — Melba Bumgarner
*Assistant Examiner* — Steven J. Hylinski
(74) *Attorney, Agent, or Firm* — Weaver Austin Villeneuve & Sampson LLP

(57) ABSTRACT

Systems and methods for tracking RFID gaming chips at a gaming table are disclosed. Gaming chips include an outer body with center and rim portions, and a plurality of RFID tags contained within the outer body. Signals from gaming chip RFID tags can be encrypted only for readers having an appropriate private key, and can be subject to a variable time delay unique to each RFID tag. Separate RFID tags within one gaming chip can be identical for security purposes, and to increase "visibility" to associated RFID readers at the gaming table. Security breach components within RFID tags can reduce or prevent unauthorized writing or tampering attempts to an RFID gaming chip. Further system components include a gaming table and a plurality of RFID reading devices distributed thereabout, including transponders and antennae. Such RFID reading devices are disposed beneath an upper surface of the gaming table in a grid-like fashion.

22 Claims, 4 Drawing Sheets

U.S. PATENT DOCUMENTS

| | | | | |
|---|---|---|---|---|
| 6,446,208 | B1 * | 9/2002 | Gujar et al. | 713/185 |
| 6,626,757 | B2 * | 9/2003 | Oliveras | 463/13 |
| 6,629,889 | B2 * | 10/2003 | Mothwurf | 463/25 |
| 6,663,490 | B2 | 12/2003 | Soltys et al. | |
| 6,774,800 | B2 * | 8/2004 | Friedman et al. | 340/573.5 |
| 6,784,789 | B2 * | 8/2004 | Eroglu et al. | 340/10.6 |
| 6,869,360 | B2 * | 3/2005 | Marks et al. | 463/25 |
| 6,888,509 | B2 * | 5/2005 | Atherton | 343/718 |
| 6,969,906 | B2 * | 11/2005 | Choi | 257/685 |
| 7,012,529 | B2 * | 3/2006 | Sajkowsky | 340/572.1 |
| 7,049,962 | B2 * | 5/2006 | Atherton et al. | 340/572.1 |
| 7,088,245 | B2 * | 8/2006 | Guntersdorfer et al. | 340/572.5 |
| 7,142,120 | B2 * | 11/2006 | Charych et al. | 340/572.4 |
| 7,183,920 | B2 * | 2/2007 | Napolitano | 340/572.1 |
| 7,240,845 | B2 * | 7/2007 | Komine et al. | 235/492 |
| 7,250,864 | B2 * | 7/2007 | Murofushi et al. | 340/572.1 |
| 7,253,734 | B2 * | 8/2007 | Moskowitz | 340/572.3 |
| 7,267,614 | B1 * | 9/2007 | Jorasch et al. | 463/25 |
| 7,283,054 | B2 * | 10/2007 | Girvin et al. | 340/572.3 |
| 7,561,053 | B2 * | 7/2009 | Hecht et al. | 340/572.7 |
| 2002/0006829 | A1 * | 1/2002 | Purton | 463/47 |
| 2002/0036237 | A1 * | 3/2002 | Atherton et al. | 235/492 |
| 2002/0173352 | A1 * | 11/2002 | Oliveras | 463/13 |
| 2003/0022714 | A1 * | 1/2003 | Oliver | 463/25 |
| 2003/0075608 | A1 * | 4/2003 | Atherton | 235/492 |
| 2003/0117330 | A1 | 6/2003 | Guntersdorfer et al. | |
| 2003/0177347 | A1 * | 9/2003 | Schneier et al. | 713/151 |
| 2004/0066278 | A1 * | 4/2004 | Hughes et al. | 340/10.1 |
| 2004/0066296 | A1 * | 4/2004 | Atherton | 340/572.1 |
| 2004/0087375 | A1 * | 5/2004 | Gelinotte | 463/47 |
| 2004/0127277 | A1 * | 7/2004 | Walker et al. | 463/16 |
| 2005/0026672 | A1 * | 2/2005 | Roukis | 463/16 |
| 2005/0110610 | A1 * | 5/2005 | Bazakos et al. | 340/5.82 |

FOREIGN PATENT DOCUMENTS

| | | | | |
|---|---|---|---|---|
| EP | 1211630 | | | 6/2002 |
| EP | 1528514 | | | 5/2005 |
| EP | 1548630 | A2 | * | 6/2005 |
| JP | 2003016396 | A | * | 1/2003 |
| JP | 2003279648 | | | 10/2003 |
| WO | 9606409 | | | 2/1996 |
| WO | 9636253 | | | 11/1996 |
| WO | 0016289 | | | 3/2000 |
| WO | 0022585 | | | 4/2000 |
| WO | 02077939 | | | 10/2002 |
| WO | 2005022443 | | | 3/2005 |
| WO | 2005105235 | | | 11/2005 |
| WO | 2006037220 | | | 4/2006 |
| WO | WO 2007012109 | A1 | * | 2/2007 |
| WO | WO 2007025061 | A2 | * | 3/2007 |

OTHER PUBLICATIONS

U.S. Appl. No. 11/225,299, filed Sep. 12, 2005.

EP First Office Action issued in European Application No. 06790165.2, dated Jul. 8, 2008, 6 pages.

EP Second Office Action issued in European Application No. 06790165.2, dated Mar. 2, 2009, 7 pages.

EP Summons to Attend Oral Proceedings, issued in European Application No. 06790165.2, dated Feb. 3, 2010, 7 pages.

CN First Office Action issued in Chinese Application No. 200680033559.8., with English translation, dated Feb. 12, 2010, 21 pages.

CN Second Office Action issued in Chinese Application No. 200680033559.8. with English translation, dated Dec. 1, 2010, 10 pages.

* cited by examiner

ENHANCED GAMING CHIPS AND TABLE GAME SECURITY

TECHNICAL FIELD

The present invention relates generally to casino gaming, and more specifically to systems and methods for conducting and tracking transactions at table games and other locations on the floor of a casino or other gaming establishment.

BACKGROUND

Casinos and other forms of gaming comprise a growing multi-billion dollar industry that has experienced many changes and innovations in recent years. While gaming machines have become a staple for many casinos and gaming establishments, table games remain an immensely popular form of gaming and a substantial source of revenue for gaming operators as well. Such table games can include poker, blackjack, craps, roulette and other traditional standbys, as well as other more recently introduced games such as pai-gow, Carribean Stud, Spanish 21, and Let It Ride, among others. Under a typical gaming event at a gaming table, a player places a wager on a game, whereupon a winning may be paid to the player depending on the outcome of the game. As is generally known, a wager may involve the use of cash or one or more chips, markers or the like, as well as various forms of gestures or oral claims. The game itself may involve the use of, for example, one or more cards, dice, wheels, balls, tokens or the like, with the rules of the game and any payouts or pay tables being established prior to game play. As is also known, possible winnings may be paid in cash, credit, one or more chips, markers, or prizes, or by other forms of payouts.

A primary concern in the administration of table games by a casino or other gaming establishment is the management and tracking of gaming chips or markers used by players and casino personnel in general to denote monetary values, as well as to "cash in" players, make wagers, pay out winnings, "cash out" players, and the like. Such gaming chips typically come in varying denominations, such as, for example, $1, $5, $25, $100, $1000 and $10,000, although a wide variety of other denominations and currencies for gaming chips are certainly known and possible. Various systems and methods for managing and tracking transactions in a casino environments are known, such as that which is disclosed in, for example, U.S. Pat. Nos. 5,651,548; 5,735,742; and 6,663,490, each of which is incorporated by reference herein in its entirety and for all purposes.

In particular, the first two of these references deal with the use of radio frequency identification ("RFID") tags as a way of identifying and tracking the movement of gaming chips within a casino environment, and specifically in the context of a gaming table. To implement such a system, an RFID tag is typically embedded within each gaming chip to be used in the system. RFID readers and antennae are then deployed at a gaming table to track the RFID tag embedded gaming chips. As is generally known, such as from the first two references above, for example, each gaming table typically has a set number of chip placement areas, such that an RFID system antenna can be placed at each such chip placement area to facilitate the chip reading and tracking.

Although useful, such basic RFID chip tracking systems tend to have several drawbacks. For example, it has been experienced that RFID antennae and readers positioned about the table may not detect and/or a read one or more particular RFID embedded gaming chips on occasion. This is particularly noticeable where there are a large number of gaming chips stacked atop one another, and also where multiple gaming chips are accumulated in one region in random unstacked fashion. As another drawback, the antennae and readers that are typically used tend to have very limited range, such that gaming chips that are slightly outside a particular chip placement area might not be detected. Of course, gaming chips that may be outside designated bet regions or other chip placement areas very likely go undetected and unread altogether. For example, gaming chips that may be stacked directly in front of a player but are not subject to a current bet or wager will likely go undetected. This can be unfortunate in some circumstances, particularly where the casino or other gaming establishment desires to track gaming chips in a more comprehensive manner.

Another potential drawback to the way RFID embedded gaming chip systems are currently designed is that the RFID components themselves tend to be rather simplistic. For example, data is typically transmitted from a gaming chip to a table reader in clear text, with such data usually defining a chip denomination, chip serial number, the site location and so forth. As is generally known, however, a casino can be a magnet for thieves, cheats and unscrupulous individuals. To the extent that such persons could provide their own equipment to read RFID embedded gaming chips, decipher the data thereupon, and/or even possible write to or alter data on such gaming chips, the typically simple clear text approach may result in serious problems to the gaming establishment. Further, such persons may attempt to dissect a gaming chip or otherwise remove the embedded RFID tag from the chip for various reasons, such as to further attempt to gain information. As another example of the general simplistic nature of man, current RFID gaming chip systems, these systems also tend to use gaming chips having a single simple embedded RFID tag, with such a tag being passive, having limited memory and functionality, and having no writing or other dynamic capabilities.

Thus, although existing systems and methods for providing identification and tracking of casino gaming chips through embedded RFID tags may have been adequate in the past, improvements to such existing systems and methods are usually encouraged. It is thus desirable to provide such improvements, and in particular for such systems and methods to involve more dynamic RFID tags within casino gaming chips with greater security features and general functionalities, and in particular for such gaming chips to be more readily identifiable and traceable regardless of position or orientation at a system gaming table.

SUMMARY

It is an advantage of the present invention to provide improved systems and methods for automatically identifying and tracking gaming chips within a gaming environment, such as at a gaming table. This is accomplished in many embodiments by providing various RFID components for use in association with system gaming chips. In particular, enhanced gaming chips can be created by embedding a plurality of RFID tags into each single gaming chip, with such RFID tags having enhanced security measures and other sophisticated functionalities. In some embodiments, such RFID tags can generally be placed about the chip, rather than being embedded.

According to several embodiments of the present invention, the disclosed systems and methods involve one or more gaming chips adapted for use in a betting environment involving the placement of wagers, the play of games based on the wagers, and the grant of payouts based on the results of the games. As noted above, such gaming chips are preferably used at least to designate monetary amounts with respect to transactions amongst or between gaming establishments and patrons. Such a gaming chip in the present invention can include an outer body having a center portion and a rim portion, as well as a specific monetary denomination and amount that is designated on an outer surface thereof, such as by a label, ink or other suitable indications or markings. A plurality of RFID tags are preferably contained within the outer body of the gaming chip, with each of these plurality of RFID tags being adapted to provide an answer signal in response to an interrogation signal from an outside RFID source. Each separate RFID tag within a given gaming chip may be adapted to provide one or more functions separate from all other RFID tags within the gaming chip. In addition, the same function may be provided by multiple RFID tags, in order to increase the likelihood that at least one RFID tag within a given gaming chip is identified and read by an RFID reading device at the gaming table.

In some embodiments, the multiple or plurality of RFID tags within a single gaming chip may be spaced apart by some distance. For instance, all RFID tags may be included within a center portion of the gaming chip. Alternatively, one or more RFID tags may be included within the center portion of the gaming chip, while one or more separate RFID tags may be included within the rim portion of the gaming chip. Various arrangements of multiple RFID tags within a single gaming chip may be used in order to maximize the "visibility" of the gaming chip to an RFID reader or reader system at the gaming table. In other embodiments, the plural but separate RFID tags may be adjoined next to each other within or about a respective gaming chip. In some embodiments, one or more of the plurality of separate RFID tags within a given gaming chip may be identical for various reasons.

In some embodiments of the present invention, which may include one or more of the forgoing or following embodiments, one or more RFID tags within a given gaming chip can be programmed to incorporate a time delay feature when responding to a signal for information from the gaming chip. Such RFID tags can each include a time delay circuit adapted to cause a time delay in an answer signal emitted from the RFID tag incident to said interrogation signal emitted from an outside RFID reader or source. Such a feature can be used within many or all RFID gaming chips in a system in order to maximize the "visibility" and readability of all gaming chips at a table at any given time, since many of the difficulties inherent to reading multiple gaming chips at a single location or gaming table can be overcome by way of staggered responses from the collection of RFID gaming chips. In some embodiments, a specifically unique delay time can be programmed into each gaming chip, such that no two gaming chips within a system will respond at exactly the same time to a given output signal from a transponder within the RFID system. Such time delays can be on the order of 0 to 10,000 milliseconds, and more preferably between 0 and 3000 milliseconds.

According to some embodiments of the instant invention, communications from/and or to a gaming chip may be encrypted for greater security. Encryption techniques capable of being performed on a small scale suitable for use in an RFID tag application are preferred. In particular, at least one of the plurality of RFID tags within a given RFID gaming chip can be adapted to transmit data therefrom using at least one encryption protocol, preferably using a public and private key approach. In such an arrangement, the private key can be held by one or more of the system reading components, such that an outside person or party attempting to read the data on an RFID gaming chip would be unable to do so without having the private key.

In some detailed embodiments of the present invention, which may be combined with one or more other embodiments, additional security features may also be provided for some or all of the RFID gaming chips in a system. A security breach component can be adapted to alter automatically the data stored on an affected RFID tag when any unauthorized external source attempts to affect that RFID tag. Such outside attempts can include unauthorized attempts to write data to the RFID tag, as well as unauthorized attempts to physically remove the RFID tag from the outer body of its respective gaming chip. Alterations of data stored on such an affected RFID tag can include the recordation of a breach alert on the RFID tag, and could also include a complete deletion of all recorded data on the RFID tag in some instance. A recording of an attempted breach could then be read by appropriate authorized system readers the next time the affected gaming chip is in the vicinity of a system reading device.

According to further embodiments of the present invention, a more comprehensive chip tracking system can be provided. Such a system can include one or more of the forgoing RFID equipped gaming chips, as well as a specialized gaming table or other suitable gaming venue adapted for the play of games or any other transaction involving such gaming chips. In the case of a gaming table, such a table can have a chip tray adapted to hold various RFID gaming chips and an upper surface for the placement of wagers and/or play of games. Such a specialized gaming table can have RFID reading devices, such as antennae and transponders, arranged in a grid-like fashion beneath the playing surface of the gaming table, and in such a way so that any RFID gaming chip located on the surface of the gaming table can be detected and read. This includes gaming chips that are out of play for a designated round, such as those within a dealer chip tray and those stacked in front of players that are not subject to a current game wager. Additional components, such as a system processor, server, memory and database may also be used. The gaming table can have a specific number of designated chip placement areas on its playing surface, with such areas including bet placement areas and cash for chips transaction areas. In some embodiments, the number of RFID reading devices distributed about the gaming table is greater than the number of designated chip placement areas.

In some embodiments of the present invention, various methods of identifying and tracking RFID gaming chips at gaming tables are provided. Such methods can include the steps of providing a gaming table, and also of providing multiple RFID gaming chips, wherein each such gaming chip contains multiple RFID tags, as noted above. Further steps can include conducting a transaction between a host gaming establishment and a patron involving at least one of the RFID gaming chips and emitting an interrogation signal from an RFID reading device located at the gaming table during or in close time proximity to the transaction, as well as receiving one or more answer signals from a first RFID gaming chip involved in the transaction in response to the emitted interrogation signal. Where an encryption protocol is used, the method can further involve the step of decrypting the answer signal or signals from the RFID gaming chip or chips involved in the transaction. Of course, multiple RFID gaming chips can be involved in such transactions, such that additional steps can include receiving answer signals from such additional RFID gaming chips in response to the interrogation signal. Where a time delay component may be included with the involved RFID gaming chips, the steps of receiving answer signals from each RFID gaming chip can come at different times. Further steps of the various methods can also include transmitting one or more answer signals to a processor associated with the gaming table, as well as storing data derived from these answer signals to a memory associated with the processor. Additional steps can also include comparing various separate answer signals with each other, and may also include generating an alert where such a comparison results in an unexpected result. Such steps can be particularly useful where a given RFID gaming chip is adapted to contain separate and identical RFID tags, such as for verification and security purposes.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods involving enhanced gaming chips and table game security. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

One advantage of the present invention is the introduction of systems and methods that enhance the automated identification and tracking of RFID gaming chips within a gaming environment, such as at a gaming table. This is accomplished in part by the introduction of multiple RFID tags within or about each gaming chip to be used in the tracking system. Various difficulties in identifying and reading RFID embedded gaming chips in the prior art are overcome through the implementation of features such as multiple RFID tags per gaming chip, extensive additions of antennae and readers about the gaming table or other venue, and a time delay component to the individual responses from each RFID tag or gaming chip, among other features.

Another advantage of the various apparatuses, systems and methods disclosed herein are the increased security features provided for such RFID gaming chips. Increased security can be accomplished in part by providing one or more encryption techniques or protocols as part of the RFID tag and reader system, such that plain unprotected data is not generally transmitted from the RFID gaming chips. A security breach feature can also be added, such that when an unauthorized write command or attempt to remove an RFID tag from a gaming chip is detected, an appropriate alert and/or other counteraction can be made.

Figure 1:
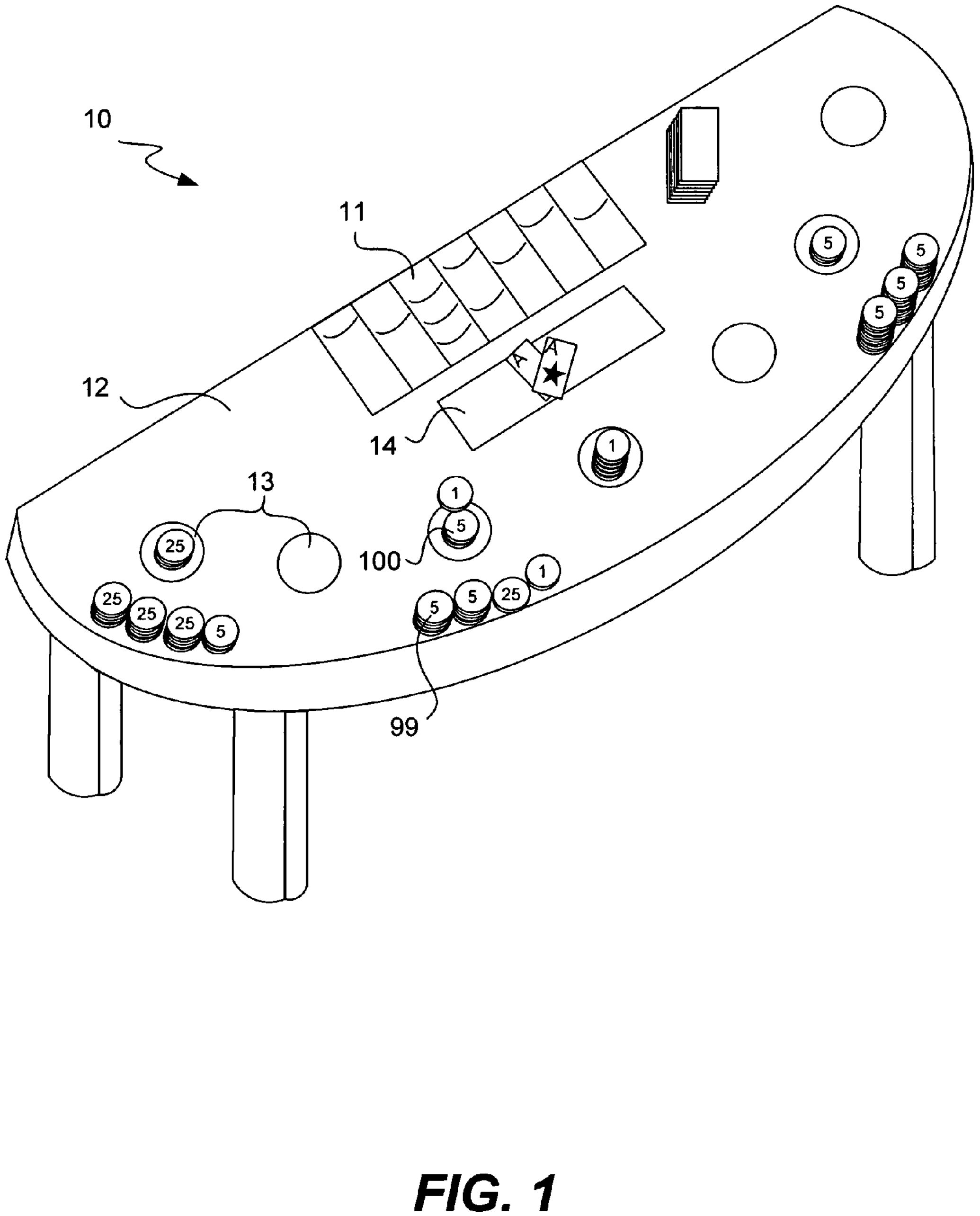
FIG. 1 illustrates in top perspective view an exemplary gaming table according to one embodiment of the present invention.

Turning first to FIG. 1, an exemplary gaming table according to one embodiment of the present invention is illustrated in top perspective view. From its outer appearance, gaming table 10 preferably generally looks to be just like any other gaming table that a patron might encounter at a casino or other gaming establishment. Differences between specialized gaming table 10 and any other ordinary gaming table can include the presence of RFID gaming chips in use at the table, as well as RFID reading devices and other related components, which may preferably be located beneath the gaming table or in other non-obtrusive locations, as detailed below. Gaming table 10 has a chip tray 11 adapted to store a plurality of gaming chips, including RFID gaming chips, as well as an upper surface 12 adapted for the play of games and various other transactions involving gaming chips. Various designated chip placement areas 13, 14 are distributed about the upper surface 12 of the gaming table 10. Such chip placement areas can include bet or wager placement areas 13, as well as a general cash for chips or other chip conversion area 14.

Gaming chips 99, 100 of one or more denominations may also be located atop the upper surface 12 of the gaming table, particularly during times of gaming activity at the table. For example, gaming chip 100 is a $5 chip that is subject to a current wager in a bet placement area, while gaming chip 99 is a $5 chip designated as belonging to a player that is not subject to a current play or action at the gaming table. As will be readily appreciated, gaming chips 99 and 100 may be identical or substantially similar, with the possible exception of RFID tags contained on the chips, as detailed below. Although gaming table 10 has the general appearance of a blackjack table or table for a similarly distributed game, it will be readily appreciated that the inventive gaming tables of the present invention can also be extended to other forms of gaming tables and gaming venues. For example, similar specialized gaming tables or venues can be adapted for use as a craps table, a roulette layout, and/or a sports book counter or presentation, among other suitable gaming tables or venues.

Figure 2:
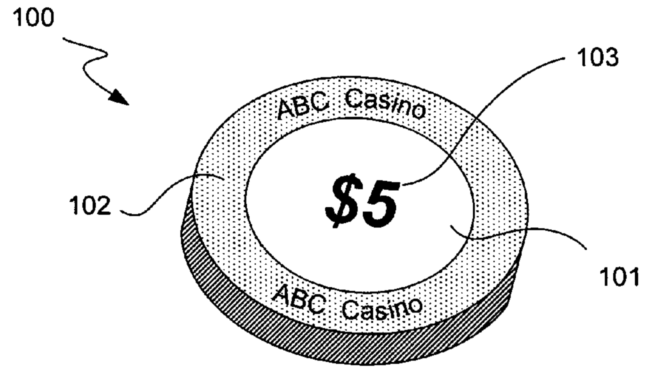
FIG. 2 illustrates in top perspective view the exterior of an exemplary gaming chip according to one embodiment of the present invention.

Continuing next to FIG. 2, the exterior of an exemplary gaming chip according to one embodiment of the present invention is illustrated in top perspective view. Gaming chip 100 generally includes a center portion 101, an outer rim portion 102 and a specific monetary denomination and amount 103 designated on an outer surface, such as on the center portion. As shown, gaming chip 100 is a $5 chip for use at "ABC Casino." Other designations, such as a casino name, advertising, and/or multiple color schemes may also be included on one or more outer surfaces of gaming chip 100. Although the exemplary gaming chip shown has distinctive center and rim portions, it is specifically contemplated that the present invention can be implemented on other gaming chips that may not have such portions distinctively set forth, as will be readily appreciated. Regardless of the exact style and type of gaming chip used, it is preferable that a significant number of gaming chips used in the inventive systems and methods herein each have multiple RFID tags embedded therein. Whether gaming chips similar to or substantially different in style and type from the exemplary gaming chips disclosed are used, it is also preferable, although not required, that such RFID system gaming chips at least resemble gaming chips that do not contain RFID tags. In some embodiments, the presence of RFID tags within the RFID gaming chips should be largely undetectable or at least not obtrusive to the typical patron.

Wireless RFID tags are commercially well known, and there exist numerous manufacturers that currently offer a wide selection of RFID tags, many of which may be suitable for implementation within a gaming chip. Such RFID tags can generally be passive (typically operating near 125 kHz), such that an external transponder or other device tends to deliver the RF energy needed to power the tag, or active (often operating near 2.45 GHz), such that a battery or other power source tends to be coupled to the tag. Of course, other frequency ranges and power sources are also possible, and it is specifically contemplated that any such arrangement that may be suitable for use in a gaming chip can be used. Major manufacturers of RFID tags include Texas Instruments of Dallas, Tex. and Motorola of San Jose, Calif. among numerous other providers.

As noted above, each single gaming chip preferably contains a plurality of RFID tags, each of which may include one or more functional components to be used by a table game management system, a casino chip tracking system, and/or any other suitable system within a casino where gaming chip identification or tracking may be desired. Each RFID tag within a given gaming chip may be adapted to provide a different function or functions with respect to other RFID tags within the same gaming chip. For example, on a gaming chip having two embedded RFID tags, a first RFID tag can be "read-only" and dedicated to reflecting security information, the gaming chip denomination, a specific gaming chip serial number, and/or other relevant chip information. A second RFID tag could be "read-write" and thus used for changeable information, such as player tracking, gaming chip location history and/or gaming chip transaction history, which information could be written, read and rewritten. Such player tracking information might include not only identifying information for the player, but also a history of transactions made by the player using the particular gaming chip. Thus, one RFID tag could contain read only data, while another within the same gaming chip could be a read-write RFID tag.

Other RFID tags having specialty functions could also be separately embedded or otherwise contained on a single gaming chip. Such specialty functions could include bonusing information, progressive jackpot information, added player tracking and comping data, as well as other information. In some embodiments, one or more RFID tags could have overlapping or identical functions. In some instances, two or more RFID tags on a single gaming chip could even be identical, such as for security and verification purposes. For example, where precautions against unwanted tampering with RFID gaming chips are desired, one or more of such gaming chips may contain identical RFID tags. When signals are emitted from the identical RFID tags from such gaming chips, the emitted signals should be identical, and could be compared to verify as such. Where an outside party or other unauthorized source has tampered with one of the RFID tags such that an improper or otherwise altered signal is given, then an unexpected result would be detected upon comparison of the multiple signals emitted from that tampered RFID gaming chip. An appropriate alert and/or other action could then be taken by the casino or other gaming establishment.

In addition, further security features could also be included on one or more RFID tags on a single gaming chip. In contrast to the relatively simple RFID communications currently used with gaming chips having single RFID tags, one or more RFID tags on a gaming chip of the present invention can be adapted to communicate using one or more encryption protocols or techniques. As one possible example, Texas Instruments currently provides a number of RFID tags adapted to communicate through encrypted means. These include the DST-40 series of RFID tags, as well as various DST-Plus and other higher security encryption based RFID tags. As will be readily appreciated, any version or series of such RFID tags could be used, with appropriate selection based on security levels and speed being made as desired. As is generally known, higher encryption levels (and thus greater security) tend to result in tags that have a longer startup time, since increased bit levels result in extended interaction time with the transponder or other outside reading device.

Where the encryption of data stored on system RFID tags is included, it is preferable that public keys be distributed to the various gaming chips, while the private key or keys are held by the system run by the host casino or other gaming establishment. Of course, any form of encryption suitable for use in an environment involving RFID tags and readers may be used in association with the present invention. Through the use of such encryption methods, tampering by criminals and other unscrupulous persons who might attempt to improperly read and/or rewrite the contents of an RFID chip can be thwarted or at least deterred.

In still further embodiments, which may be combined with one or more of the foregoing embodiments and features, additional features can be included within one or more RFID tags to help detect when a tampering attempt has occurred. Such a tampering attempt can include attempts by unauthorized parties to write to an RFID tag within a gaming chip, as well as attempts to dissect a gaming chip or otherwise remove or isolate an RFID tag from the body of its respective gaming chip. To help detect unauthorized write attempts, an RFID tag may require an appropriate input signal or secured identification means from the outside device attempting to write to the RFID tag. In the event that the outside device is an appropriate RFID transponder that is part of the casino operated system, a proper ID or other secured information can be provided such that the desired writing function can proceed smoothly.

Where such a proper identifier or other secure password is not presented to the RFID tag upon a write attempt, however, then the RFID tag can be programmed to note the attempt to write to the tag as being made without an apparent authorization or proper access information for writing or overwrite purposes. Such a status can then be stored on the RFID tag for reporting to a proper system transponder or other read device upon the next instance of the RFID tag detecting such a device. Another possible result from an improper write attempt is for the RFID tag to be programmed to erase any or all of the data stored thereon. Such erasure can further thwart the attempts of outside parties to manipulate, reverse engineer or otherwise learn information about the RFID gaming chip system employed by a given casino or other gaming establishment. For example, where an unauthorized hacking attempt is detected, it may be prudent for an affected RFID gaming chip to be programmed to simply erase all data relating to chip location history, transaction history, bonusing status, player tracking status, and so forth. Information that might remain could include a static chip identifier or serial number, as well as a chip denomination.

As yet another security feature that could be included in one or more of the RFID adapted gaming chips of the present invention, one or more mechanisms might be included with some RFID tags in order to detect when a separation with the outer body of the gaming chip is attempted. For example, a small spring-loaded tab or other similarly adapted item could be coupled to a fuse on the RFID tag such that the tag could easily detect when it has been removed from the body of its gaming chip. Other mechanical, thermal and/or electrical adaptations could also be used to help detect when a physical removal of an RFID tag is attempted. As in the foregoing embodiments regarding an unauthorized write attempt to a tag, similar consequences might attach to any attempt to remove an RFID tag from its associated gaming chip, notably the recording of an alert on the RFID, as well as the erasure of some or all of the data that might be stored on the RFID tag.

It is specifically contemplated that the use of RFID tags within gaming chips can be tied to monitoring and/or tracking the various transactions, movements and other activities of such gaming chips in a variety of manners and contexts. For example, gaming chips that have been implemented with RFID chips can be tracked at times of cashing in or cashing out at the gaming table, amongst other transactions. A player approaching the table with a $105 EZ Pay® ticket might offer the ticket for gaming chips, and after the ticket is validated, $105 worth of RFID enabled gaming chips can be placed in a designated area on the table that can be read by an RFID chip reader at the table. The $105 EZ Pay® ticket can then be canceled and taken away at or about the same time that the $105 worth of read and verified RFID enabled gaming chips are pushed toward or otherwise provided to the player. Regardless of the specific implementation, RFID chip readers are preferably adapted to forward RFID gaming chip data to one or more locations, such as a cashless interface device at the gaming table, a LAN based server and/or database, and/or a centralized WAN based server and/or database or data repository.

In some embodiments, an RFID chip tracking system can be adapted to work in conjunction with one or more bill acceptors, cashless interface devices and/or other suitable cash or credit tracking devices at the subject gaming tables or other tracked gaming activity venues or locations. In such arrangements, cash, printed tickets or other suitable credit instruments can be input to a bill acceptor, ticket acceptor or reader, or other suitable device as part of a regular cash in and/or cash drop procedure at a gaming table or other suitable venue, whereupon a corresponding level of gaming chips are then provided to the player providing the cash or credit. An automated check can then be performed between the readings made of the bill acceptor or other suitable credit accepting drop device and the RFID reading devices to ensure that the proper level of gaming chips have been provided to the player. For example, where a player "buys in" at a tracked gaming table by providing a $100 bill, twenty $5 RFID embedded gaming chips might be provided to the player, such as in a manual transaction by the dealer. Contemporaneously or soon thereafter, one or more RFID reading devices at the table can detect that twenty $5 RFID embedded gaming chips have been provided to the player, at which time this information can be correlated with the $100 drop information. In the event that 19 or 21 gaming chips have been inadvertently provided to the player, an alert can be provided and appropriate correction made. Of course, manual or partially manual transactions involving a casino dealer, a patron, or both, may also be identified and tracked.

At the very least, it is specifically contemplated that the present system may also include at least one associated processor and at least associated memory to facilitate the processing and possible storage of data regarding RFID gaming chip related transactions. As will be readily appreciated, a system involving multiple gaming tables, venues, cashier cages, casino vaults and other locations where gaming chips are used and stored can include a vast array of suitable RFID reading devices at many such venues and locations, such that gaming chips and their histories can be tracked and recorded constantly. To this end, a central server and data repository may also be used with such a system, with data being accessible to various casino employees at various locations as may be desired.

To the extent that improved detection and reading abilities, or "visibility," within an overall RFID gaming chip tracking system are desired, a number of items and potential added features can come into play. As noted above, the inclusion of multiple RFID tags within each gaming chip may provide some increased visibility for such chips in some instances. For example, to the extent that known RFID chips having single embedded RFID tags are limited in their tag implementations and antennae arrangements, multiple tags distributed about the chips with more extensive antennae patterns may be more likely to be detected by a transponder, antenna, or other outside reading device.

In addition, a time delay circuit component or other similarly suitable device can be added to one or more of the RFID tags, such that a given incident or interrogation signal from an outside transponder or other RFID device results in staggered responses from the various affected RFID gaming chips within range of that interrogating device. As is generally known in the art, a single interrogation signal can result in a cacophony of answer signals from multiple RFID tags. Where such responses are unduly numerous, detection and processing of all such answer signals can become problematic, resulting in lost data or even undetected responses altogether. To combat this problem, which is well-known with respect to large stacks or collections of RFID embedded gaming chips, a time delay response element can be built into many or all of the RFID tags within the gaming chips. Such response delays can be provided through the use of a simple capacitative element or other suitable combination within the overall circuit, as will be readily appreciated.

As one exemplary system application where a given gaming establishment has 10,000 gaming chips that are to be implemented with RFID tags, the tags for each such gaming chip can be programmed to have a response delay that is different than every other chip. For example, each chip of the 10,000 gaming chips can have a programmed delay time of 0 to 10,000 milliseconds, in 1 millisecond increments, such that the delay from any given chip will be anywhere from 1 millisecond to 10 seconds, and the delay time for each chip is different than the delay time for every other chip in the system. Of course, smaller increments than 1 millisecond could also be provided, particularly where there are to be more gaming chips in the system, and also where a 0 to 10 second response delay is considered to be too long.

In some embodiments then, a 0 to 3000 millisecond delay may be preferable, such that a 3 second delayed response is the maximum delayed response time. Of course, the shrinking of the overall response time and/or the use of greater numbers of gaming chips in the system may result in some gaming chips having identically delayed response times. Alternatively, further divisions of response times may be possible, such as microseconds. In any event, given the length of time needed for a typical response, there may invariably be some instances where two different gaming chips are providing parts of their answer signal back to the system at the same time. Although possibly not ideal, such instances are preferable to the current situation where all gaming chips respond at the same time, resulting in a huge volume of signals that may not all be detected or interpreted thoroughly.

In some embodiments, one or more RFID gaming chips could even be adapted to communicate with each other. For instance, where an RFID transponder or other reading device delivers enough RF power to facilitate communications between RFID tags on the same or separate gaming chips, information regarding neighboring chips and transactions can be exchanged. Although relatively expensive, it is also contemplated that batteries may be incorporated into one or more RFID gaming chips where extra power is desired such that communications between gaming chips and/or added processing capacity within one or more RFID tags in the gaming chip can be better accomplished.

Moving now to FIGS. 3A through 3D, several exemplary arrangements of multiple RFID tags within a single gaming chip according to various embodiments of the present invention are all illustrated in top plan view. Starting first with FIG. 3A, exemplary gaming chip 110 contains a first RFID tag 114 located within a center portion of the gaming chip and a second RFID tag 116 located in a rim portion of the gaming chip. As in the case of each of these exemplary arrangements of RFID tags within gaming chips, gaming chip 110 may appear on its surface to look exactly like gaming chip 100 of FIG. 2. In fact, as shown from outer appearance only, gaming chip 100 could represent any of gaming chips 110, 120, 130 or 140 from any of FIGS. 3A through 3D. Included within gaming chip 110 are antennae 115, 117 coupled to RFID tags 114, 116 respectively, as will be readily appreciated by those skilled in the art. Although depicted as being relatively short in length and in relatively restricted patterns, it will be readily appreciated that these antennae may be longer and may extend further out from each RFID tag in one or more directions. For example, antenna 115 for RFID tag 114 may extend in a spiral that substantially fills the entire center portion of gaming chip 110, while antenna 117 for RFID tag 116 may extend across and substantially fill the entire rim portion of the gaming chip.

In some embodiments, RFID tags 114 and 116 may be in communication with each other, while in other embodiments, isolation from each other may be preferred. As noted above, various functions may be separated completely into one RFID tag or the other. For example, one RFID tag might be used simply to store basic read-only information about the gaming chip (e.g., denomination and serial number), while the other tag might be used to store reprogrammable information, such as a transaction and location histories. Alternatively, or in addition, one RFID tag might be adapted for encrypted communications, while the other is not. Further, a time delay response component might be included in only one RFID tag, or different response times can be programmed into each RFID tag. It should be noted that each of and/or any mix of these characteristics might also apply to any other arrangement of RFID tags within a gaming chip, such as those provided in FIGS. 3B-3D below.

Figure 3A:
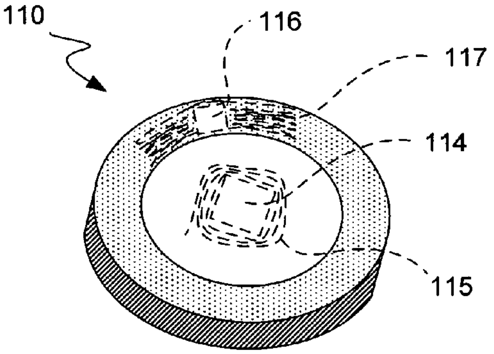
FIG. 3A illustrates in top plan view one interior version of the exemplary gaming chip of FIG. 2 according to one embodiment of the present invention.
Figure 3B:
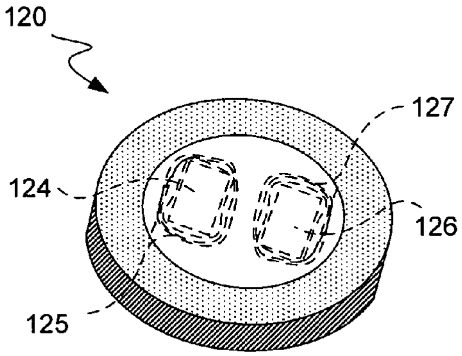
FIG. 3B illustrates in top plan view an alternative interior version of the exemplary gaming chip of FIG. 2 according to another embodiment of the present invention.
Figure 3C:
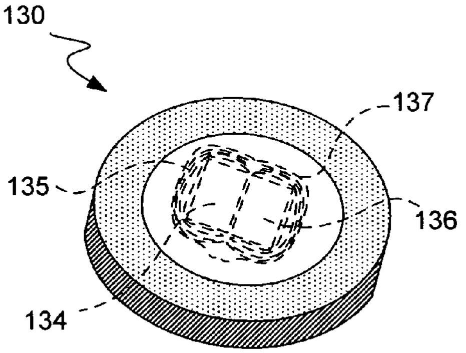
FIG. 3C illustrates in top plan view yet another alternative interior version of the exemplary gaming chip of FIG. 2 according to yet another embodiment of the present invention.

Continuing with FIG. 3B, separate RFID tags 124 and 126 are both provided within the center portion of gaming chip 120, albeit spaced apart by some distance. Of course, each tag has its own antenna 125, 127, and it will again be understood that the lengths and/or patterns for each RFID antenna may be designed differently as may be desired. In FIG. 3C, gaming chip 130 also contains two RFID tags 134, 136, having antennae 135, 137 respectively. Unlike the previous examples, however, RFID tags 134 and 136 are adjacent to each other, such as at the center of the center portion of the gaming chip. As in the foregoing examples, these tags may be in communication with each other, or may alternatively be electrically isolated from each other. In one embodiment, RFID tags 134 and 136 may even be within one overall housing or unit, although distinctively separate from an electrical and/or functional point of view.

Figure 3D:
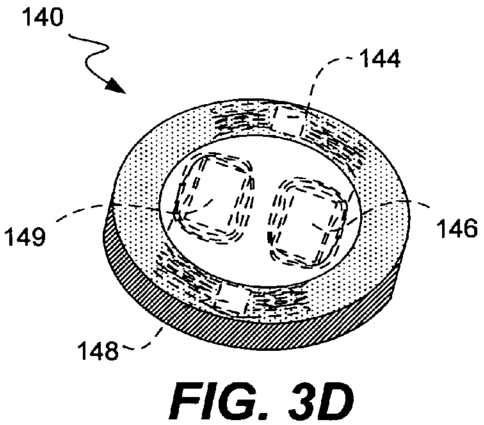
FIG. 3D illustrates in top plan view still another alternative interior version of the exemplary gaming chip of FIG. 2 according to still another embodiment of the present invention.

Moving to the last exemplary arrangement of FIG. 3D, gaming chip 140 contains four separate RFID tags 144, 146, 148, 149, with two being in the center portion of the gaming chip and two being in the rim portion. One or more of these separate RFID tags may be in communication with each other, and each may provide one or more different functions. In addition, some of RFID tags 144, 146, 148 and 149 may be identical to each other, such as where security functions involving the comparison of answer signals are desired. Of course, portions or all of the RFID tags of any of the foregoing examples might also be identical, particularly where security solutions involving comparing answer signals from separate RFID tags within the same gaming chip may be a heightened priority. As will be readily appreciated, any or all of the foregoing arrangements might be used to duplicate information on a plurality of RFID tags within a single gaming chip, particularly where increased "visibility" and reliability with respect to detecting and reading are desired.

Figure 4A:
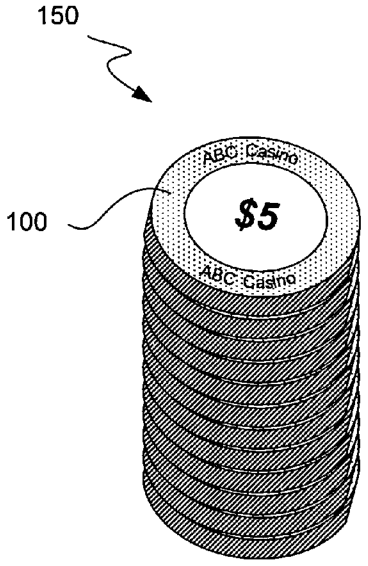
FIG. 4A illustrates in top perspective view a stack of the exemplary gaming chips of FIG. 2 according to one embodiment of the present invention.
Figure 4B:
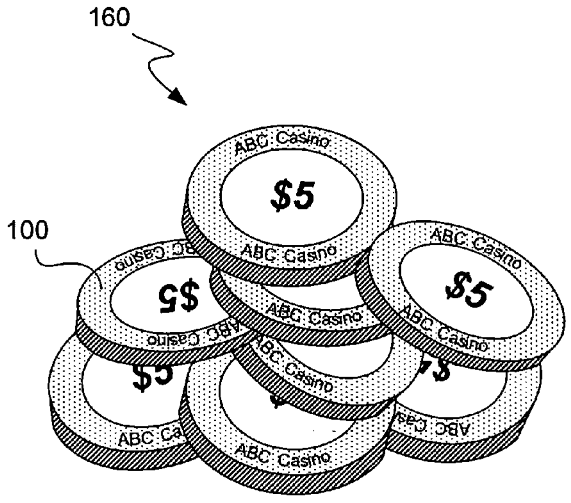
FIG. 4B illustrates in top perspective view a random unorganized collection of the exemplary gaming chips of FIG. 2 according to one embodiment of the present invention.

FIG. 4A illustrates in top perspective view a stack 150 of the exemplary gaming chips 100 of FIG. 2, while FIG. 4B illustrates in top perspective view a random unorganized collection 160 of the exemplary gaming chips 100 of FIG. 2 according to various embodiments of the present invention. As noted above, the actual configurations of RFID tags within each of the chips in FIGS. 4A and 4B may be any of the exemplary configurations shown above, as well as any other suitable configuration of RFID tags that might be used in such gaming chips. As is generally known, systems using gaming chips having singular RFID tags that communicate in simple RF form tend to have problems reading all chips accurately once such RFID gaming chips are stacked at about the level of the chip stack 150 in FIG. 4A, or higher. Multiple signals and particularly interference amongst such signals from all chips at once can be difficult to read. This is especially true where the single RFID tag within each gaming chip is generally located in the same place, and where there tends to be only one RFID reader associated with each gaming chip placement location at a gaming table or other associated gaming venue. As is also generally known, similar detection and reading problems can occur when the number of randomly placed or disorganized gaming chips is the same as or higher than that which is shown in the chip pile 160 of FIG. 4B.

Unlike that which is known in the art, however, the present systems and methods include the use of RFID gaming chips that are more "visible" to the various reading devices in the system. As noted above, there are multiple RFID tags located at each gaming chip. In addition, a time delay component can be incorporated into some or all of the RFID tags within the gaming chips of the system, such that staggered answer responses occur from the various affected gaming chips in response to an interrogation signal from an RFID transponder at the gaming table or other venue adapted to track RFID gaming chips. These features alone help to increase the detectability and readability of RFID gaming chips in the current system such that all of the gaming chips in the stack 150 of FIG. 4A and the jumbled pile 160 of FIG. 4B can be detected and read without undue problems or errors. An additional feature that can also aid in detecting and reading various system gaming chips is the use of a more comprehensive gaming table or other RFID gaming chip reading venue.

Figure 5:
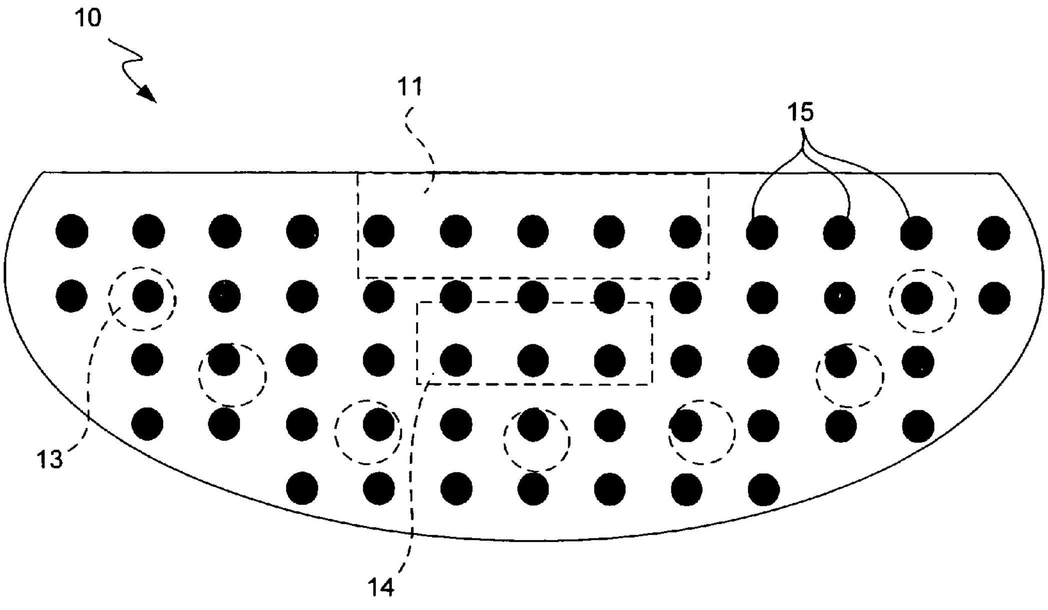
FIG. 5 illustrates in bottom plan view an exemplary arrangement of RFID reading devices at the gaming table of FIG. 1 according to one embodiment of the present invention.

Turning next to FIG. 5, an exemplary arrangement of RFID reading devices at the gaming table of FIG. 1 according to one embodiment of the present invention is illustrated in bottom plan view. As noted above, it is preferable that gaming table 10 generally appear to patrons to be like any other ordinary gaming table. To this end, the various RFID detection devices 15 located at the table can be placed beneath the upper surface of the table, so as not to be obtrusive. Such RFID detection devices can include transponders, readers, antennae or any combination thereof, as may be suitable to assist in the reading of RFID gaming chips at the table. As shown, such reading devices 15 can be placed under the chip tray 11, under each of the bet placement areas 13, and under the cash for chips exchange area 14. Of course, additional RFID reading devices may also be provided, and it is preferable that enough devices be provided so that the detection and reading of various amounts and formations of gaming chips on the gaming table surface can be accomplished with relative ease and reliability.

In a preferred embodiment, a grid of RFID detection devices 15 is distributed about or beneath gaming table 10, so as to better detect and read the various RFID tags contained within the gaming chips on the surface of the table. Of course, such a grid-like distribution results in there being more RFID reading devices at the gaming table than there are designated chip placement areas on the surface of the table. The inclusion of such a grid or array of RFID reading devices also means that gaming chips outside the designated chip placement areas may also be read. For example, chips placed directly in front of a player could be read by the various RFID reading devices 15 distributed at gaming table 10. As shown in FIG. 1, gaming chip 99 could be read by the reading devices at gaming table 10, while such a gaming chip at this location would not typically be read at a gaming table known in the art.

In this manner, preferably all gaming chips present at the surface of the gaming table at any given time can be detected and read by the RFID devices and system at the gaming table. Such an ability greatly increases the options that are available to a gaming establishment with respect to the detection and tracking of gaming chips, particularly at a gaming table or other suitably trackable gaming venue. Again, this may also include poker tables, craps tables, roulette tables, sports books, cashier cages, casino back room vaults and many other locations within a casino.

In addition to the largely stationary nature of the reading devices shown in the foregoing embodiments, it is also specifically contemplated that other forms of RFID reading and tracking devices could be used in conjunction with the various inventive systems and methods disclosed herein. For example, a hand-held wand or other suitable RFID reading device could be used to scan RFID gaming chips, particularly as such gaming chips move from place to place throughout the casino. In particular, gaming chips being moved to or from a back vault, cashier cage, chip tray or other secure location could be scanned and read en masse through the use of such a hand-held wand or other device. Where multiple trays or racks of RFID gaming chips are to be read at once, even greater systems can be employed as may be desired. For example, a large cart sized region full of high powered RFID transponders may be placed in a designated area at a vault or cashier cage, such that racks, trays or carts full of chips might be read in a relatively short span of time. Other adaptations may also be used in this regard, as will be readily appreciated.

Figure 6:
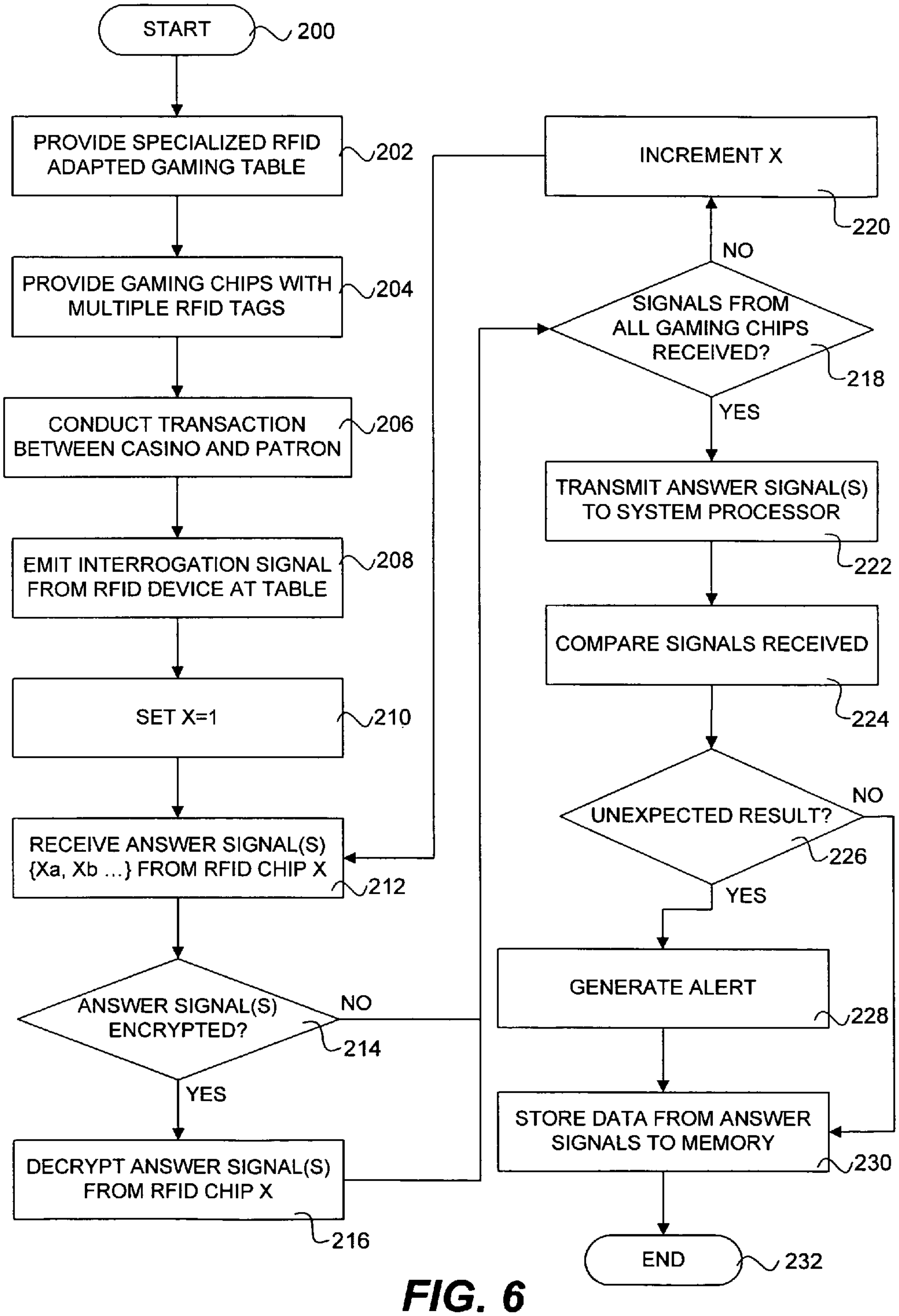
FIG. 6 illustrates a flowchart of an exemplary method of tracking gaming chips at a gaming table according to one embodiment of the present invention.

Moving lastly to FIG. 6, a flowchart conveying an exemplary method of tracking gaming chips at a gaming table according to one embodiment of the present invention is shown. While the provided flowchart may be comprehensive in some respects, it will be readily understood that not every step provided is necessary, that other steps can be included, and that the order of steps might be rearranged as desired by a given gaming equipment manufacturer, casino, other gaming establishment or other system operator. After start step 200, a specialized RFID adapted gaming table is provided at a process step 202. While such a specialized gaming table can be that which is described in detail above, it will also be understood that this "gaming table" could also be any of a variety of gaming equipment items for use in a gaming environment, and that such can be used at a table game, sports book, keno lounge, or other suitable gaming location.

At subsequent process step 204, one or more specialized RFID equipped gaming chips having multiple RFID tags each are provided. Such RFID gaming chips can be any of those specifically described in the forgoing embodiments, as well as any suitable variations thereof. At following process step 206, a transaction between the gaming establishment and patron is conducted. Such a transaction could be, for example, an exchange of cash for gaming chips, gaming chips for different denominations of gaming chips, a wager being placed by the patron, a collection of a losing wager by the casino or other gaming establishment, or a payout of additional gaming chips by the gaming establishment to the patron as a result of a winning game outcome, among other possible transactions. An interrogation signal is emitted from one or more RFID devices at the gaming table at the next process step 208, and the timing of this step preferably occurs during or soon after the transaction of process step 206, such that the gaming chips involved in the transaction can be detected.

Pursuant to the interrogation signal sent from an RFID transponder or other similar device in process step 208, one or more answer signals from RFID tags embedded in system gaming chips at the table are then returned in a series of steps that is repeated from process steps 212 through 220 until all RFID gaming chips have responded. To designate this series of steps, a counter "X" is set to 1 at process step 210, and is incremented at process step 220 until all RFID gaming chips at the gaming table have emitted answer signals in response to the interrogation signal. Of course, other method variations are possible, such as a method where only some subset of RFID gaming chips respond to a given interrogation signal. For purposes of simplicity, however, it will be assumed that all RFID gaming chips at the gaming table respond to a specific interrogation signal.

At process step 212, one or more answer signals are received from a given RFID gaming chip. As noted above, this may only mean one answer signal for some types of RFID gaming chips, or could mean multiple answer signals from a single RFID gaming chip. Again, one possible embodiment where multiple answer signals from a given RFID gaming chip would be desirable would be that where identical answer signals are to be sent, received and compared to check for possible security breaches or tampering with the RFID gaming chip. At subsequent decision step 214, an inquiry is made as to whether any of the answer signal or signals from the gaming chip are encrypted. If so, then such signal or signals are decrypted at process step 216. The method then continues to decision step 218, where an inquiry is made as to whether signals from all gaming chips have been received. If not, then the method continues to process step 220 where the counter is incremented, and steps 212 through 220 are repeated until signals from all gaming chips have been received.

At subsequent process step 222, the answer signals are all transferred to a system processor or server. As noted above, the exact order of steps in this exemplary method can be altered if desired, such that signals from each RFID gaming chips can be sent to the processor in real time as they are received, while other answer signals from other RFID chips still have yet to be received. Received signals can then be compared at process step 224, such as to check for errors or possible tampering with one or more RFID gaming chips. At decision step 226, an inquiry is made as to whether there are any unexpected results in any comparison of answer signals, such as, for example, data from expected identical answer signals not matching exactly. If such an unexpected result occurs, then an alert can be generated at process step 228. In any event, the method then continues to process step 230, where data from the various answer signals is stored to a memory associated with the processor. Such a memory might be, for example, a database, which might be associated with a server that provides the processing function. As noted above, a plurality of specialized gaming tables may be linked over a network, such that a common server and/or database may be useful for such a plurality of tables. Finally, the method ends at end step 232. Again, various details and additional steps may similarly be included, and it is specifically contemplated that many different arrangements of steps and variations of this exemplary method may also be practiced.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming system comprising:

a gaming table having a chip tray and an upper surface including a number of gaming chip placement areas;

a plurality of gaming chips placeable within the chip tray, at least one of said plurality of gaming chips containing a plurality of RFID tags wherein at least one of the RFID tags is adapted to transmit data using at least one encryption protocol; and a plurality of RFID reading devices distributed about the gaming table, each adapted to read data transmitted from one or more of the gaming chips located at the upper surface of the gaming table;

wherein at least one of the plurality of RFID tags includes at least one tamper proof RFID tag having a security breach component that automatically makes an alteration of data stored on the tamper proof RFID tag when an external source makes an unauthorized attempt to write data to the tamper proof RFID tag, said alteration comprising at least one of recording an alert on the RFID tag and erasing at least some of the data from the RFID tag.

2. The gaming system of claim 1, wherein the gaming chip placement areas include one or more bet placement areas and at least one cash for chips transaction area.

3. The gaming system of claim 1, wherein the plurality of RFID reading devices distributed about the gaming table include one or more transponders, one or more antennae, or both.

4. The gaming system of claim 1, wherein some or all of the RFID reading devices are distributed about the gaming table beneath the upper surface.

5. The gaming system of claim 1, wherein the use of the at least one encryption protocol includes storing a public key on the at least one RFID tag and storing a private key associated with the public key on at least one of the RFID reading devices.

6. The gaming system of claim 1, wherein each of the gaming chips includes at least one RFID tag having a time delay circuit component that causes a time delay in a response emitted from an RFID tag to a signal emitted from one or more of the RFID reading devices.

7. The gaming system of claim 6, wherein each gaming chip has a different time delay.

8. The gaming system of claim 6, wherein the time delay ranges from 0 to 10,000 milliseconds.

9. The gaming system of claim 6, wherein the time delay ranges from 0 to 3000 milliseconds.

10. The gaming system of claim 1, further comprising:

a processor in communication with the plurality of RFID reading devices, the processor adapted to process data sent from each of the RFID reading devices; and a memory in communication with the processor and adapted to store data transmitted therefrom.

11. A method comprising:

receiving, at a first RFID gaming chip, an interrogation signal from an RFID reading device located at a gaming table during or immediately following a transaction between a host gaming establishment and a patron, said transaction occurring at the gaming table and involving the first RFID gaming chip, said first RFID gaming chip being one of a plurality of RFID gaming chips;

transmitting, in response to said interrogation signal, at least two separate answer signals, respectively from two separate RFID tags contained within the first RFID gaming chip;

wherein the first RFID gaming chip includes at least one tamper proof RFID tag having a security breach component that automatically makes an alteration of data stored on at least one of the two separate RFID tags when an external source makes an unauthorized attempt to write data to the tamper proof RFID tag, said alteration comprising at least one of recording an alert on the RFID tag, and erasing at least some of the data from the RFID tag.

12. The method of claim 11, wherein at least one of the RFID tags contained within the first RFID gaming chip transmits at least one of the at least two separate answer signals using at least one encryption protocol.

13. The method of claim 11, wherein at least one of the RFID tags contained within each of the gaming chips includes a time delay circuit component that causes a time delay in transmission of the one or more answer signals, and further including a step for:

transmitting, in response to said interrogation signal, at least one answer signal from a second RFID gaming chip of the plurality of RFID gaming chips that is involved in the transaction; wherein the steps for transmitting one or more answer signals from the first RFID gaming chip and for transmitting at least one answer signal from the second RFID gaming chip occur at different times.

14. A gaming chip comprising:

a center portion, a rim portion, and a specific monetary denomination and amount designated on an outer surface thereof; and a plurality of RFID tags contained within the gaming chip, each of the RFID tags adapted to provide an answer signal in response to an interrogation signal from an RFID source;

wherein at least one of the RFID tags comprises a tamper proof RFID tag having a security breach component that automatically makes an alteration of data stored on at least one of the RFID tags when an external source makes an unauthorized attempt to write data to the tamper proof RFID tag, said alteration comprising at least one of recording an alert on the at least one RFID tag and erasing at least some of the data from the at least one RFID tag.

15. The gaming chip of claim 14, wherein at least one of the RFID tags is adapted to transmit data using at least one encryption protocol.

16. The gaming chip of claim 14, wherein at least one of the RFID tags is located within the center portion of the gaming chip, and wherein at least one other of the RFID tags is located within the rim portion of the gaming chip.

17. The gaming chip of claim 14, wherein at least two of the RFID tags are identical.

18. The gaming chip of claim 14, wherein at least one of the RFID tags includes a time delay circuit component that causes a time delay in transmission of the answer signal.

19. The gaming chip of claim 18 in a gaming system having a plurality of similarly constructed gaming chips, wherein the time delay of the at least one RFID tag is different than every other time delay of all other RFID tags in all gaming chips in the gaming system.

20. The gaming chip of claim 18, wherein the time delay ranges from 0 to 10,000 milliseconds.

21. The gaming chip of claim 18, wherein the time ranges from 0 to 3000 milliseconds.

22. A gaming chip comprising:

a center portion, a rim portion, and a specific monetary denomination and amount designated on an outer surface thereof; and one or more RFID tags contained within the gaming chip, at least one of the RFID tags adapted to provide an intentionally delayed answer signal in response to an interrogation signal from an RFID source, and at least one of the RFID tags being a tamper proof RFID tag that automatically makes an alteration of data stored on the tamper proof RFID tag when an external source makes an unauthorized attempt to write data to one or more of the RFID tags, said alteration comprising at least one of recording an alert on the RFID tag and erasing at least some of the data from the RFID tag.

* * * * *